United States Patent Office 3,329,446
Patented July 4, 1967

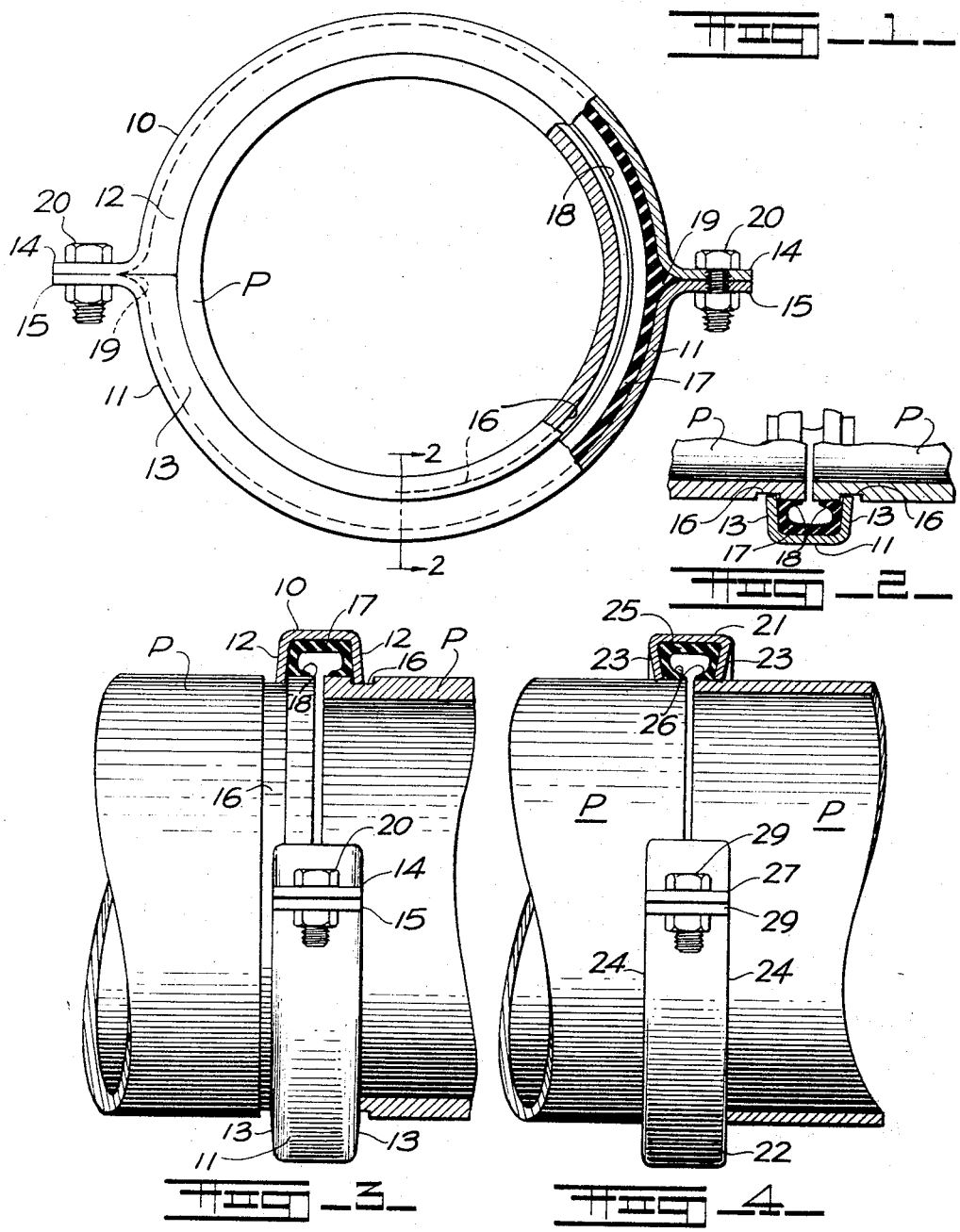

3,329,446
PIPE COUPLING
William R. Katis and John J. McCoy, Youngstown, Ohio, assignors to "Automatic" Sprinkler Corporation of America, Youngstown, Ohio
Filed Aug. 18, 1966, Ser. No. 573,262
1 Claim. (Cl. 285—112)

This invention relates to a pipe coupling and more particularly to a simplified form of split couplings with an integrally formed one-piece gasket adapted to join the ends of two lengths of pipe together simply, efficiently and economically.

The principal object of the invention is the provision of a pipe coupling utilizing a pair of oppositely disposed clamping members formed as metal stamping and arranged to enclose a one-piece gasket in clamping arrangement on the ends of two lengths of pipe to be joined together.

The usual way of joining or coupling two lengths of pipe together comprises threading the adjacent ends of the two pipes and screwing the threaded pipes into an internally threaded cylindrical coupling member or fitting the adjacent ends of the pipes with flanges which are then bolted together. There are many instances when it is impractical to couple the adjoining ends of pipe together in either of the aforementioned ways and a number of different pipe couplings have been devised by which two sections of pipe can be joined together without prior threading or flanging the ends of the pipes. One of these earlier pipe couplings uses a cylindrical center section which spans the ends of the pipes together with separate circular gaskets which fit about the ends of the pipes adjacent the center section of the coupling. Clamping means is then fitted about the ends of the pipe and arranged to be drawn together to force the circular gaskets into the narrow annular space between the cylindrical center section and the cylindrical outer surface of the pipes.

Another successful pipe coupling comprises a cylindrical gasket adapted to span the ends of the pipes and two semi-cylindrical clamp members which are clamped about the gasket and the adjacent ends of the pipes. This construction requires that a groove be formed in the outer pipe wall and the semi-cylindrical clamp members brought into registry therewith to prevent the pipe connection from being pulled apart.

Both of these pipe couplings require the placement of one or more of their parts about the outer surface of one or both of the pipes being joined before the ends of the pipes are brought into their final abutting position. The clamping action of the semi-cylindrical clamp members of the earlier devices is such that the gasket member is frequently extruded particularly in the areas where the semi-cylindrical clamp members join one another. The extrusion of the gasket results in early failure of the coupling.

The present invention utilizes a pair of semi-cylindrical metal stampings having oppositely disposed inturned flanges throughout their semi-cylindrical configuration and oppositely disposed outturned arms through which fasteners such as nut and bolt assemblies may be positioned for moving the clamp members toward one another. A one-piece gasket is provided which is positioned within the inturned flanges of the semi-cylindrical clamp members and is provided on its outer surface with oppositely disposed outwardly extending projections positioned between the opposed arms on the semi-cylindrical clamp members. This construction precludes the extrusion of the gasket. The metal stampings forming the semi-cylindrical clamp members are arranged and formed so that their oppositely disposed inturned flanges will register with annular grooves in the pipes in one form of the invention or directly engage the outer walls of the pipes in a modified form of the invention as hereinafter set forth.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is an end view of the pipe coupling in position on pipes being joined with parts broken away and parts in cross section.

FIGURE 2 is a cross section on line 2—2 of FIGURE 1.

FIGURE 3 is a side elevation of the pipe coupling and pipes seen in FIGURE 1 with parts broken away and parts in cross section.

FIGURE 4 is a side elevation of a modified form of pipe coupling showing the same with parts broken away and parts in cross section and positioned on the ends of the pipes.

By referring to the drawings and FIGURES 1, 2 and 3 in particular, a preferred form of the invention will be seen to comprise a pair of clamping members having semi-cylindrical or semi-circular body members 10 and 11, each of which are identical metal stampings having oppositely disposed inturned flanges 12 and 13 respectively forming a body member U-shaped in cross-section and each of which has a pair of outwardly extending oppositely disposed arms or flanges 14 and 15 respectively. It will be observed that the arms or flanges 14 and 15 extend outwardly from the flanged portion of the semi-cylindrical body members 10 and 11 and that the ends of the flanges 12 and 13 respectively are arranged in abutting relation as clearly shown in the left hand portion of FIGURE 1 of the drawings.

In FIGURES 1, 2 and 3 of the drawings the pipe coupling is shown positioned on a pair of pipe P and which pipes have annular grooves 16 formed therein adjacent the ends thereof. Grooves 16 are spaced with respect to the ends of the pipes P so that the oppositely disposed inturned flanges 12 and 13 on the body members 10 and 11 respectively may engage the same as best seen in FIGURES 2 and 3 of the drawings. A one-piece tubular gasket 17 split on its inner circumference so as to form oppositely disposed inturned flanges 18 is positioned in the semi-cylindrical body members 10 and 11 and within the area defined by the oppositely disposed pairs of inturned flanges 12 and 13 respectively. The inturned flanges 18 of the split tubular gasket 17 are positioned on the external surfaces of the pipes adjacent the ends thereof so that fluid pressure introduced into the split tubular gasket 17 will urge the same downwardly into sealing relation with the outer surfaces of the pipes. The split tubular gasket 17 is provided on its outer sides and at oppositely disposed locations with a pair of tapered extensions 19, one of which is illustrated in cross section in the right hand portion of FIGURE 1 of the drawings and the other of which is shown in broken lines in the left hand portion of FIGURE 1 of the drawings. It will be observed that the tapered extensions 19 correspond with the outturned curved portions of the body members 10 and 11 where they form the outwardly extending clamping flanges 14 and 15 respectively, and that the provisions of the tapered extensions 19 on the outer surface of the gasket forms means filling the areas thus formed between the curved portions of the body members 10 and 11 and thus prevents the gasket from being extruded at these points as would otherwise occur.

In FIGURES 1 and 3 of the drawings fasteners comprising bolt and nut assemblies 20 are shown positioned through the registering openings in the flanges 14 and 15 and the tension exerted by the tightening of the nut and bolt assemblies 20 moves the body members 10 and 11 toward one another suitable compressing the gasket 17 to a form a liquid tight seal relative to the outer surface of the pipes P.

By referring now to FIGURE 3 of the drawings, it will be seen that the innermost arcuate edges of the inturned flanges 12 and 13 on the body members 10 and 11 respectively engage the grooves 16 in the pipes firmly in coupled position as shown.

Those skilled in the art will observe that modifications of the device disclosed herein are possible and sometimes desirable and by referring to FIGURE 4 of the drawings one such modification may be seen. In FIGURE 4 of the drawings pipes P are shown coupled by an oppositely disposed pair of semi-cylindrical body members 21 and 22 each of which has a pair of spaced inturned inwardly angled flanges 23 and 24 respectively.

The modified pipe coupling illustrated in FIGURE 4 also includes a split tubular gasket 25 having inturned flanges 26 engaged on the outer surfaces of the pipes P adjacent the ends thereof. The semi-cylindrical body members 21 and 22 have oppositely disposed outturned arms 27 and 28 respectively which are apertured and joined by nut and bolt assemblies 29. The split tubular gasket 25 is also provided with the oppositely disposed outturned tapered extensions comparable with those heretofore described and illustrated at 19 in FIGURE 1 of the drawings. In the FIGURE 4 of the drawings the oppositely disposed pairs of inturned flanges 23 and 24 are angled inwardly toward one another and their arcuate edges directly engaged on the cylindrical surface of the pipes P to be joined thereby and in the absence of any grooves therein. The arrangement is such that the angular disposition of the flanges 23 and 24 causes them to bite into the pipe so as to hold the same against movement relative thereto and fluid pressure in the pipe expanding the split tubular gasket 25 will tend to urge the inturned flanges 23 and 24 to move outwardly away from one another and as they are positioned within the areas defined by the outer opposite sides of the body members 21 and 22 such movement reduces the diameter of the opposed arcuate edges of the flanges 23 and 24 and increases the tension on the outer cylindrical surfaces of the pipes P.

It will be seen that the body members 10 and 11 and 21 and 22 are stampings formed of sheet metal and that they are, therefore, resilient and capable of adapting themselves in configuration to the outer surfaces of the pipes being joined, as contrasted with the prior art devices which relied on cast, rigid members which acted to extrude the gaskets and never completely engaged the pipes joined by the couplings using the same.

It will be seen that both forms of the pipe coupling disclosed herein can be positioned on the ends of the pipes to be coupled when the pipes are in their final position and that the clamp members are advantageously formed of inexpensive metal stamping thus meeting the several objects of the invention, and having thus described our invention.

What we claim is:

A pipe coupling for joining two sections of pipe, said coupling consisting of a pair of identical resilient sheet metal clamp members each having semi-circular body members with integral, outwardly radially extending fastener receiving flanges at each end thereof, said body being substantially U-shaped in cross-section, the flanges being joined to the base of the U at each end by a smooth curved portion, said curved flange portions of one body member cooperating with the curved portions of the flanges on the adjacent body member to form tapered notches having their apices extending radially outwardly and the legs of the U terminating in the radial plane of said flanges at their respective ends, the ends of adjacent legs of the U being in abutting relation when the flanges are clamped in face contacting relation, thereby forming a stop, a circumferentially split tubular gasket positioned in said semi-circular body members between said flanges with the split in said tubular gasket in its inner circumference, radially outwardly, oppositely disposed transversely positioned outturned tapered extensions on said gasket shaped complementary to the shape of said notches, fasteners engaged through apertures in said flanges for moving said semi-circular body members toward one another and the ends of pipes to be joined thereby, said tapered extensions on said gasket being positioned in said tapered notches between the inner ends of said flanges, whereby said gasket is retained in position therebetween.

References Cited

UNITED STATES PATENTS

| | | | |
|---|---|---|---|
| 1,994,361 | 3/1935 | Johnson | 285—112 X |
| 2,041,132 | 5/1936 | Johnson | 285—373 X |
| 2,950,930 | 8/1960 | Dunmire | 285—367 X |
| 3,015,502 | 1/1962 | Frost | 285—112 |
| 3,153,550 | 10/1964 | Hollett | 285—373 X |

FOREIGN PATENTS 968,402  2/1958  Germany.

CARL W. TOMLIN, *Primary Examiner.*

D. W. AROLA, *Assistant Examiner.*